United States Patent [19]

Shibuya et al.

[11] 4,392,717
[45] Jul. 12, 1983

[54] LIQUID CRYSTAL DISPLAY DEVICE

[75] Inventors: Yoshimichi Shibuya; Masami Takahashi, both of Mobara, Japan

[73] Assignee: Hitachi, Ltd., Tokyo, Japan

[21] Appl. No.: 223,289

[22] Filed: Jan. 8, 1981

[30] Foreign Application Priority Data

Jan. 23, 1980 [JP] Japan .................................. 55-5673

[51] Int. Cl.$^3$ .............................................. G02F 1/13
[52] U.S. Cl. ..................................... 350/334; 350/336
[58] Field of Search ................ 350/334, 336, 330, 331

[56] References Cited

U.S. PATENT DOCUMENTS 4,202,606  5/1980  Wild ............................... 350/334 X Primary Examiner—John K. Corbin
Assistant Examiner—David Lewis
Attorney, Agent, or Firm—Antonelli, Terry & Wands

[57] ABSTRACT

A liquid crystal display device comprises a pair of upper and lower substrates disposed in opposition to each other with upper and lower electrode patterns being formed on the inner surfaces of the substrates, respectively. A part or all of cross-over portions of wiring conductors of the upper and the lower electrode patterns are disposed within an effective display region with the width of the wiring conductors being reduced at the cross-over portions. The cross-over portions disposed within the effective display region are located with a predetermined distance from a display pattern to be produced. A failure such as a short-circuit formed between the upper and the lower electrode patterns is significantly reduced, while the area of the active display region can be increased.

4 Claims, 10 Drawing Figures

LIQUID CRYSTAL DISPLAY DEVICE

The present invention relates in general to a liquid crystal display device, and in more particular to a liquid crystal display device in which a part or all of intersecting or cross-over portions of upper and lower electrode patterns deposited on the inner surfaces of upper and lower substrates, respectively, are disposed in an effective or active display region of the display device.

To have a better understanding of the invention, description will first be made on a hitherto known liquid crystal display device.

In general, the liquid crystal display device comprises a pair of upper and lower electrode substrates 1 and 2 which are made of transparent glass plates and disposed in parallel in opposition to each other with a predetermined distance therebetween, as can be seen from a fragmental sectional view shown in FIG. 1. The electrode substrates 1 and 2 are coupled to each other in a hermetically sealed manner along peripheral edge portions by a sealing material 3 so as to define a space which is filled with a liquid crystal 4. Referring to a plan view shown in FIG. 2a, the inner surface of the upper electrode substrate 1 is provided with an upper electrode pattern or array 8 which is formed of an electrically conductive transparent film and includes a number of segment electrodes 5 arrayed in a predetermined pattern in accordance with displays to be produced, a plurality of lead wire conductors 6 for driving the segment electrodes 5 and a number of connecting terminals 7 for interconnection with a lower electrode pattern or array 12 which is provided or deposited on the inner surface of the lower electrode substrate 2, as described below. The lower electrode pattern 12 is also formed of an electrically conductive and transparent film and comprises common electrodes 9 disposed in opposition to the segment electrodes 5 of the upper electrode pattern 8, detouring wire conductors 10 for driving the common electrodes 9, and connecting terminals 11 for connection to the upper electrode pattern 8, as is shown in FIG. 2b. When a predetermined voltage is applied between the selected ones of the segment electrodes 5 and the common electrodes 9, a portion of the liquid crystal which lies between the segment and the common electrodes as electrically activated reacts to the applied voltage to thereby produce a display such as an analog display shown in FIG. 3 by way of example.

In the arrangement of the liquid crystal display device described above, there are regions A, B, C and D indicated by hatched areas where the lead wire conductors 6 of the upper electrode pattern 8 and the detouring wire conductors 10 of the lower electrode pattern 12 are disposed to cross or intersect geometrically or spatially (i.e. without any physical contact) one another in addition to an inherent display region Y where the segment electrodes 5 are disposed to geometrically or spatially cross the common electrodes 9. For example, in the case of the region A, nine lead wire conductors 6 of the upper electrode array 8 intersect the six detouring wire conductors 10 of the lower electrode pattern 12.

Usually, in the liquid crystal display device of this type, the width of these wiring conductors is selected to be about 100 μm with the space between the adjacent conductors being selected about 100 μm with a view to reducing the danger of failures such as breakage of wires, short-circuits or the like among the electrodes and the wiring conductors to less than 1% at the time of fabrication. Additionally, a distance of about 300 μm is provided between one side edge of the substrate and the adjacent wiring conductor in view of the desired accuracy with which the individual diaplay devices are cut away from one another. Consequently, the width of a region X (FIG. 3) which takes no part in display and is used solely for the sealing will amount to about 2 mm (since 300 μm+(100 μm×9)+(100 μm×8)≈2 mm), resulting in that the area of the effective or active region Y for display (i.e. the inherent display region) is correspondingly narrowed. In the liquid crystal display devices which are at present commercially available, the inactive region X is realized with a width in the order of 1 mm. However, in the case of the liquid crystal display device to be used for a timepiece such as the one shown in FIG. 3, it is desirable to reduce the width and hence the area of the inactive region X to a possible minimum in consideration of the fact that the outer dimension of the liquid crystal display device for the timepiece is usually as small as about 24×14 mm.

FIG. 4 shows in an enlarged scale the region A shown in FIG. 3. As can be seen from this figure, intersections or cross-over portions of the lead wire conductors 6 of the upper electrode pattern 8 and the detouring wire conductors 10 of the lower electrode pattern 12 occupy a considerable area, as indicated by hatched areas. This means that a danger of short-circuits being formed between the wiring conductors 6 and 10 of the upper and the lower electrode patterns 8 and 12 by foreign substance such as carbon, metal or the like particles possibly contained in the sealing material 3 is significantly increased when considering the fact that the space between the upper and the lower substrate is as small as about 10 μm, thereby increasing the probability of a failure. It will now be understood that the hitherto known liquid crystal display element is disadvantageous in that the effective or active display region is narrow and that the yield is considerably low due to failures such as short-circuits formed between the upper and the lower electrode patterns.

Accordingly, an object of the present invention is to provide an improved liquid crystal display element which avoids the shortcomings of the hitherto known device and which can enjoy an enlarged active or effective display region as well as an enhanced production yield.

In view of the above object, it is proposed according to an aspect of the invention that the whole or a part of the intersecting or cross-over portions of the upper and the lower electrode patterns are disposed within the active or effective display region.

The objects, features and advantages of the present invention will become more apparent from the following description of exemplary embodiments of the invention taken in conjunction with the accompanying drawings, in which.

Figure 1:
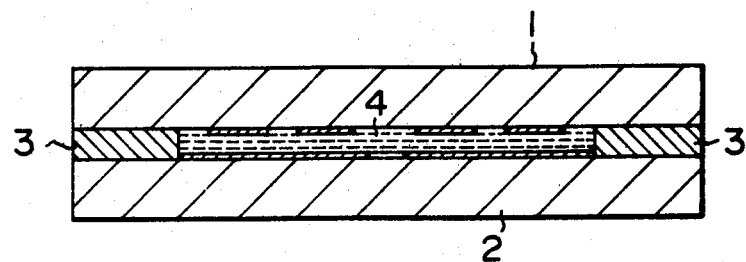
FIG. 1 is a fragmental sectional view of a hitherto known liquid crystal display device.
Figure 6:
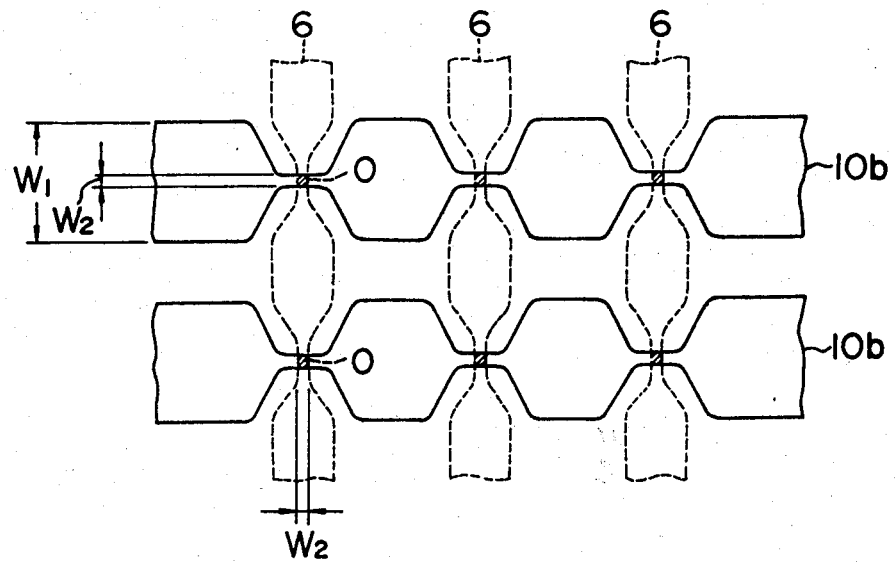
FIG. 6 illustrates an intersecting or cross-over arrangement of wiring conductors employed in the liquid crystal display device according to the invention.
Figure 2A:
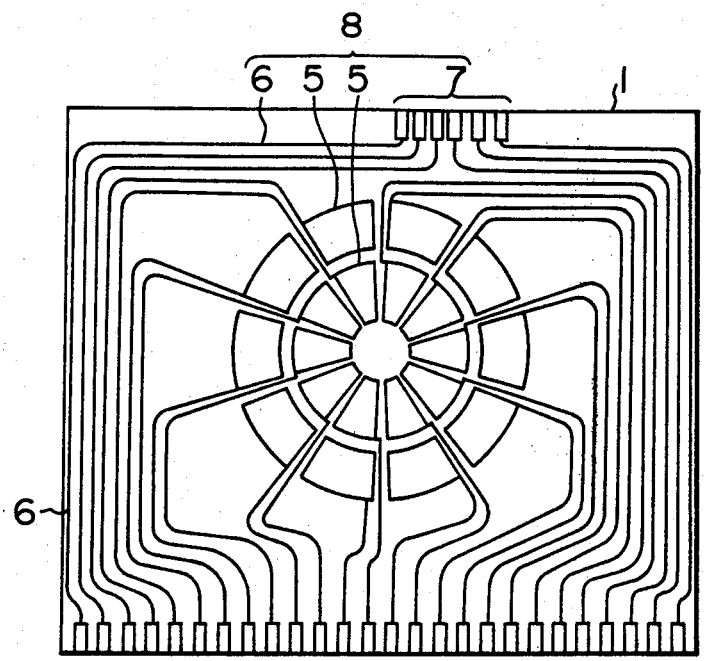
FIG. 2a is a plan view illustrating a hitherto known electrode and wiring pattern formed on the inner surface of one of the substrates constituting a part of the display device.
Figure 2B:
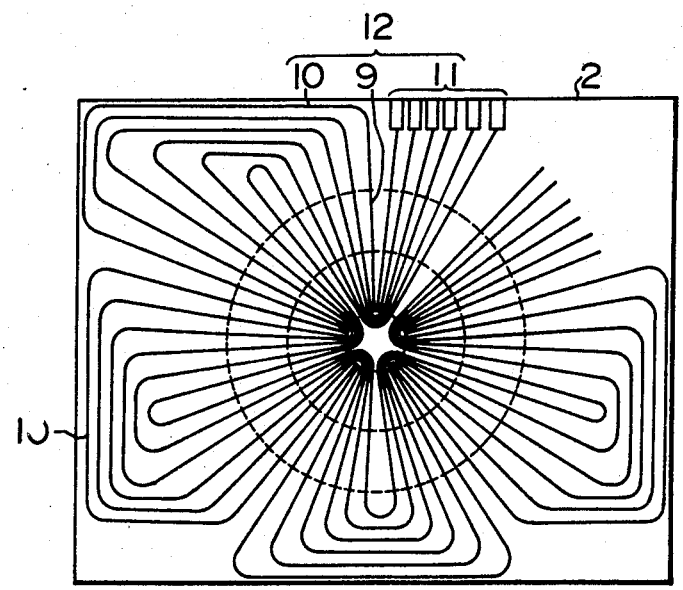
FIG. 2b is a plan view illustrating a hitherto known electrode and wiring pattern formed on the inner surface of the other substrate.
Figure 3:
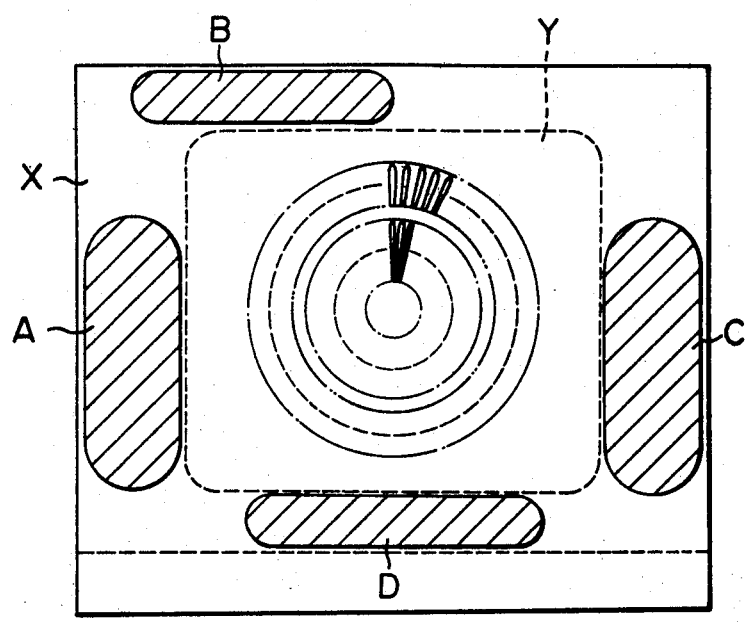
FIG. 3 is a top plan view of the display device constituted by the substrates shown in FIGS. 2a and 2b.
Figure 4:
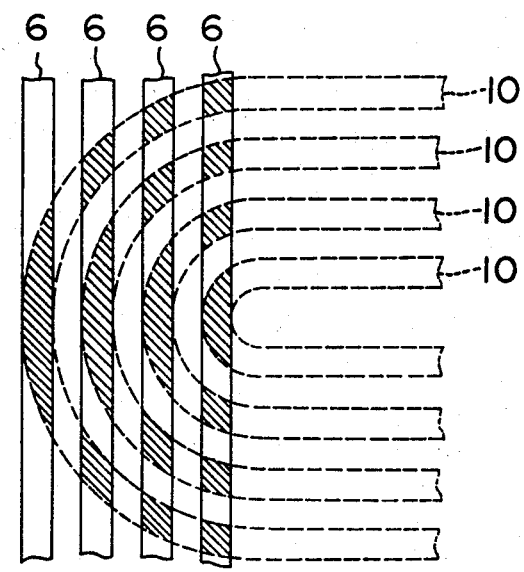
FIG. 4 is an enlarged view of a region A shown in FIG. 3 to illustrate overlaps or intersections between the wiring conductors provided on the two substrates.
Figure 5A:
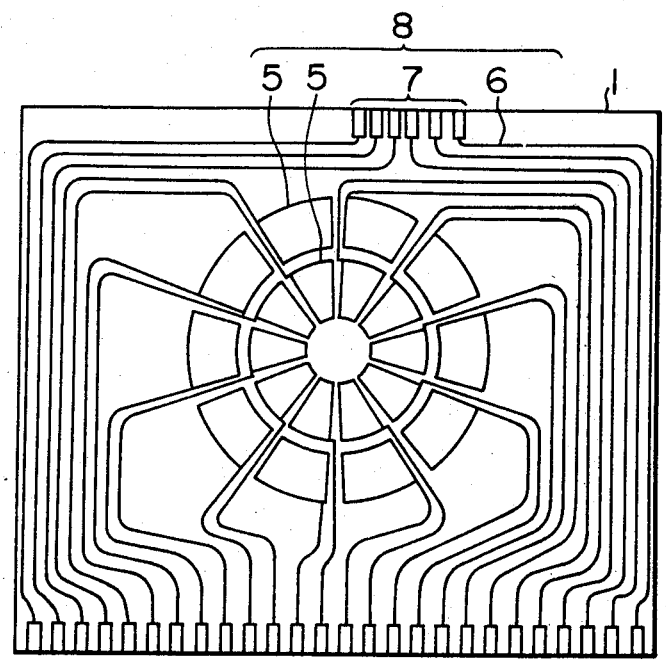
FIG. 5a is a view similar to FIG. 2a and shows an electrode and wiring pattern on the inner surface of one substrate of a liquid crystal display device according to an embodiment of the invention.
Figure 5B:
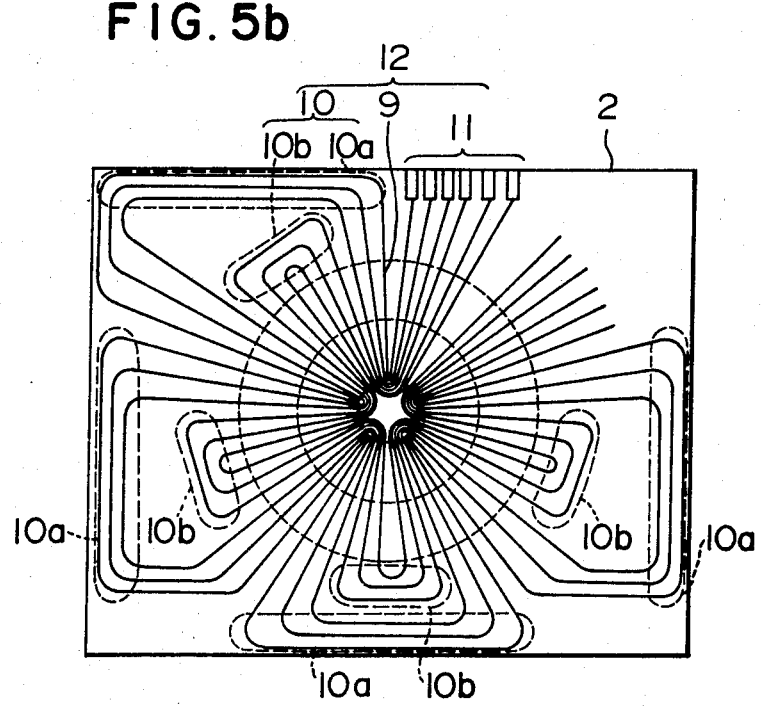
FIG. 5b is a view similar to FIG. 2b and shows an electrode and wiring pattern on the inner surface of the other substrate of the same.

Referring to FIGS. 5a and 5b which show plan views of main portions of upper and lower electrode substrates of a liquid crystal display device according to the invention and in which same symbols are used to denote same parts as those shown in FIGS. 1 to 4 for obviating repeated description thereof, the electrode pattern 8 formed on the upper substrate 1 is realized in quite the same manner as the one shown in FIG. 2a. In contrast, in the case of the lower electrode pattern 12 shown in FIG. 5b, a group of the six detouring wire conductors 10 extending over the peripheral edge portion of the substrate 2 is divided into two sub-groups each including three detouring wire conductors. More particularly, the three of the six detouring wire conductors 10a which are located nearer to the peripheral edge of the lower substrate 2 are provided in the inactive or sealing region X as in the case of the hitherto known liquid crystal display device described hereinbefore (FIG. 2b), while the other conductors 10b are disposed within the active display region Y at positions spaced outwardly from the common electrode 9 by predetermined distances (preferably of about 200 to 300 μm in the case of the illustrated example). In this connection, it is to be noted that each of the detouring wire conductors 10b formed in the active display region and having a width $W_1$ of 100 to 500 μm is extremely reduced in width to $W_2$ which is in the range of 20 to 70 μm at position 0 intersected by the lead wire conductors 6 of the upper electrode pattern, as is clearly illustrated in FIG. 6. The width of the wiring conductors 6 is also reduced to $W_2$ at the cross-over points.

Figure 7:
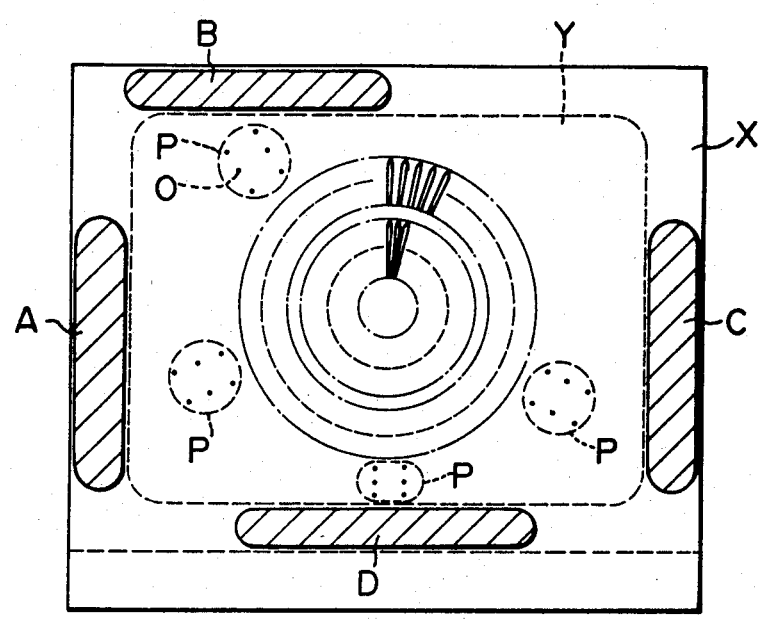
FIG. 7 shows a top plan view of the liquid crystal display device according to the invention.

With such an arrangement of the lower electrode pattern 12, each of the regions A, B, C and D where the lead wire conductors 6 of the upper electrode pattern 8 intersect the detouring wire conductors 10 of the lower electrode pattern can be decreased in area to a half or more as compared with the corresponding region of the hitherto known display device (FIG. 3), as can be seen from FIG. 7. As the consequence, the probability of failure such as the short-circuit formed between the lead wire conductors 6 and the detouring wire conductors 10 due to presence of electrically conductive foreign substances in the sealing material 3 (FIG. 1) can be significantly reduced as compared with the hitherto known display device. Further, as the inactive region X can be correspondingly decreased, the area of the inherent or active display region Y is correspondingly increased. Assuming that neither the detouring wire conductors 10b nor the lead wire conductors 6 is reduced in width in the manner described above, then intersections or cross-over points O between both conductors which are located in groups in discrete areas P spaced around the pattern display area (see FIG. 7) will become visible upon application of voltage to the associated conductors, which is of course undesirable. However, by reducing the width of both conductors 6 and 10b at the overlaps or intersections O thereof to less than about 70 μm, these intersections can be scarcely discerned by the naked eye even when the voltage is applied. Further, since all the intersections O are not electrically energized simultaneously in most or practical applications, but only a half or less number of intersections are alternatively activated, there will arise substantially no problem of degradation in the display quality. Besides, since attention of the observer usually tends to be concentrated to the pattern display area, the intersections can be made less discernible by disposing them at positions spaced outwardly from the pattern display area by the predetermined distance, as described above. Under the above conditions, an increased number of the intersections can be disposed in the active display region Y, whereby the realization of the lower electrode array 12 (FIG. 5b) in desired patterns is much facilitated, while the display quality can be significantly enhanced.

Figure 8:
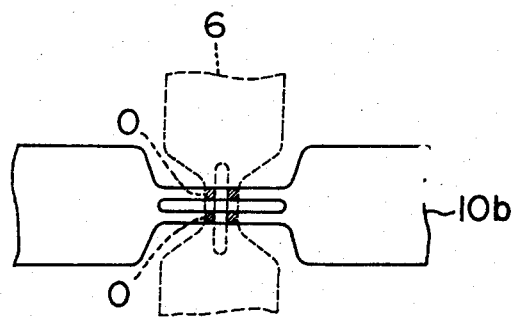
FIG. 8 shows a modification of the intersecting arrangement of the wiring conductors according to the invention.

FIG. 8 shows another embodiment of the invention. According to this embodiment, each of the conductors 6 and 10b is longitudinally bisected at each of the intersections O with a view to evading the danger of the breakage of wire and insufficiency of current flow due to increase in resistance.

In the foregoing description of the exemplary embodiment of the invention, it has been assumed that the detouring wire conductors 10 of the lower electrode pattern are divided into two groups each including three conductors and located at the inactive region and the active display region, respectively. However, the invention is never restricted to such arrangement. It should be appreciated that even when all of the detouring wire conductors 10 of the lower electrode array are disposed in the active display region Y with the intersections or cross-over points being discretely dispersed, advantageous effects similar to those described above can be accomplished.

Further, application of the invention is never restricted to the analog display device for a timepiece. The invention can be applied to numerous liquid crystal display devices for various pattern displays.

As will be understood from the foregoing description, the invention makes it possible to reduce the intersections of the wiring conductors in the inactive or sealing region of the liquid crystal display device, whereby the possibility of failure such as short-circuit formed between the upper and the lower electrode patterns due to foreign substances possibly contained in the sealing material can be remarkably reduced, while the area of the active display region can be significantly increased. Additionally, by virtue of the fact that a large number of intersections between the conductors of the upper and the lower electrode patterns can be provided, the design and realization of the electrode patterns in desired pattern are much facilitated, giving rise to a much improved display quality.

What is claimed is:

1. A liquid crystal display device comprising a pair of opposing upper and lower substrates having a liquid crystal filled therebetween and coupled to each other through an electrically insulative sealing material at the peripheral portions thereof, said upper and lower substrates being provided with upper and lower electrode patterns including wiring conductors on respective surfaces facing oppositely to each other, the wiring conductors of said upper and lower electrode patterns having cross-over portions which overlap each other between said upper and lower substrates, wherein at least a part of the cross-over portions of the wiring conductors of said upper and lower electrode patterns is disposed within an effective display region of said liquid crystal display device enclosed by said sealing material, and each of the cross-over portions of the wiring conductors of said upper and lower electrode patterns disposed within said effective display region has a width smaller than that of the remaining portion of the respective wiring conductors.

2. A liquid crystal display device according to claim 1, wherein said cross-over portions disposed within said effective display region are located at positions spaced outwardly from a display pattern to be produced.

3. A liquid crystal display device according to claim 1 or 2, wherein the smaller width of each of the cross-over portions of the wiring conductors of said upper and lower electrode patterns is in a range of 20 μm to 70 μm.

4. A liquid crystal display device according to claim 1, wherein each of the cross-over portions of the wiring conductors of said upper and lower electrode patterns disposed within said effective display region is bisected.

* * * * *